United States Patent
Ellerbrok et al.

(10) Patent No.: US 6,260,881 B1
(45) Date of Patent: *Jul. 17, 2001

(54) FABRIC PART FOR ARRANGING IN THE INTERIOR OF A GAS BAG OF A VEHICLE OCCUPANT RESTRAINT SYSTEM

(75) Inventors: Norbert Ellerbrok, Alfdorf; Norbert Lang, Leinzell, both of (DE)

(73) Assignee: TRW Occupant Restraint GmbH & Co. KG, Alfdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/395,654

(22) Filed: Sep. 14, 1999

(30) Foreign Application Priority Data

Sep. 21, 1998 (DE) .......................... 298 16 905 U

(51) Int. Cl.⁷ .................................................. B60R 21/26
(52) U.S. Cl. .................. 280/740; 280/728.1; 280/742
(58) Field of Search .................. 280/728.1, 743.1, 280/740, 742, 736, 738, 728.2

(56) References Cited

U.S. PATENT DOCUMENTS 3,810,654 * 5/1974 DeBano, Jr. et al. .......... 280/728.1
4,006,918   2/1977 MacFarland .
5,941,559   8/1999 Rudolf et al. .
5,997,036 * 12/1999 Hamada ........................... 280/743.1
6,131,942 * 10/2000 Fuji et al. ......................... 280/728.2

FOREIGN PATENT DOCUMENTS 4308387   9/1993 (DE) .
0698533   2/1996 (EP) .
0796771   9/1997 (EP) .

* cited by examiner

Primary Examiner—Eric Culbreth
(74) Attorney, Agent, or Firm—Tarolli, Sundheim, Covell, Tummino & Szabo L.L.P.

(57) ABSTRACT

The fabric part intended to be arranged in the interior of a gas bag of a vehicle occupant restraint system and comprising, when spread out flat, a generally rectangular middle section with shorter and longer outer edges as well as four fastening sections. The fastening sections are disposed at the shorter outer edges of the middle section such that each thereof extends starting from the longer outer edges along the shorter outer edges toward a longitudinal centerline of the middle section. Each of the fastening sections ends at a distance away from the longitudinal centerline.

5 Claims, 4 Drawing Sheets

FABRIC PART FOR ARRANGING IN THE INTERIOR OF A GAS BAG OF A VEHICLE OCCUPANT RESTRAINT SYSTEM

The invention relates to a fabric part for arranging in the interior of a gas bag of a vehicle occupant restraint system.

BACKGROUND OF THE INVENTION

Such fabric parts are used, more particularly, to deflect in a desired direction the flow of hot compressed gas entering the interior of the gas bag following activation of an inflator. This prevents the hot compressed gas from directly impinging the wall of the gas bag and damaging it. In addition, steering the deflection of the flow of compressed gas enables the deployment response of the gas bag to be greatly influenced, e.g. that the gas bag first deploys laterally before then deploying in the direction of the vehicle occupant towards the end of deployment, depending on the inflow direction of the compressed gas into the gas bag.

BRIEF DESCRIPTION OF THE INVENTION

The invention provides a fabric part which may be arranged in the interior of the gas bag and excels by being particularly simple to fabricate. The fabric part, when spread out flat, comprises a generally rectangular middle section with shorter and longer outer edges as well as four fastening sections. The fastening sections are disposed at the shorter outer edges of the middle section such that each thereof extends starting from the longer outer edges along the shorter outer edges toward a longitudinal centerline of the middle section. Each of the fastening sections ends at a distance away from the longitudinal centerline, thus enabling the fabric part to materialize from a flat blank. Since this blank is rectangular, no waste materializes in cutting it to size.

BRIEF DESCRIPTION OF THE DRAWINGS

The invention will now be detailed with reference to a preferred embodiment as shown in the attached drawings in which.

DETAILED DESCRIPTION OF THE DRAWINGS

Figure 1:
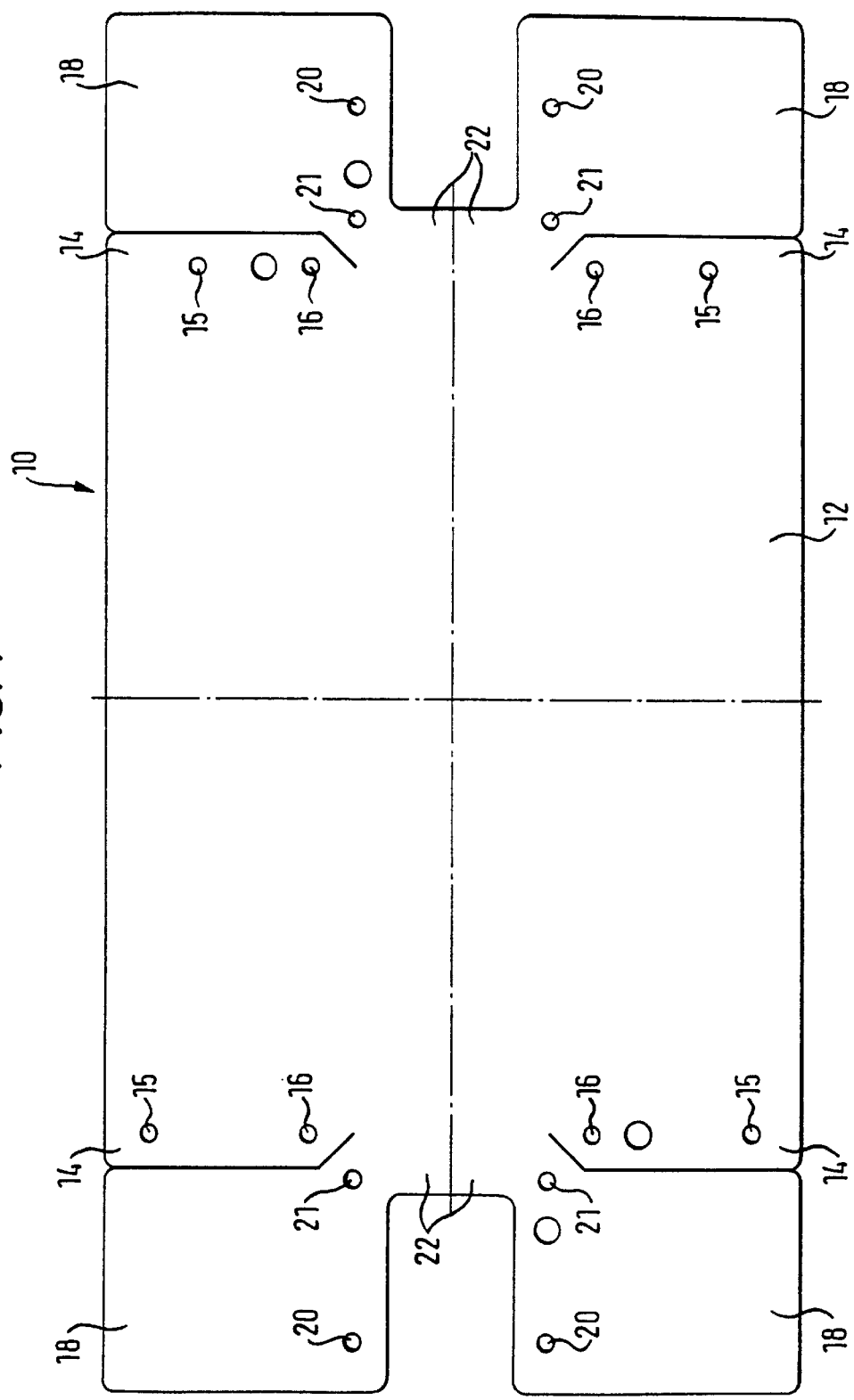
FIG. 1 is a plan view of the cutout fabric part spread out flat.

Referring now to FIG. 1 there is illustrated the fabric part 10 in its spread out flat condition as may be cut to size in one piece from a web of fabric. The fabric part 10 contains a middle section 12 provided with four fastening sections 14. Each fastening section 14 extends along one of the shorter outer edges of the middle section 12 from a longer outer edge to the longitudinal centerline, the fastening sections ending spaced away from the longitudinal centerline. Each fastening section 14 is provided with two openings 15, 16.

Arranged adjoining each fastening section 14 is a rectangular reinforcement section 18. Each reinforcement section 18 is provided with two openings 20, 21. The openings 15, 16 arranged in the fastening section 14 are located on a straight line perpendicular to the straight line on which the openings 20, 21 of the reinforcement section 18 are arranged.

Each reinforcement section 18 is connected to the middle section 12 by a transition section 22 adjoining the corresponding shorter outer edge in a portion between the longitudinal centerline of the middle section 12 and the fastening section 14. Accordingly, each of the shorter outer edges is adjoined by a fastening section 14, two transition sections 22 and a further fastening section 14, the two fastening sections together taking up roughly two thirds of the length of the corresponding shorter outer edge.

Figure 2:
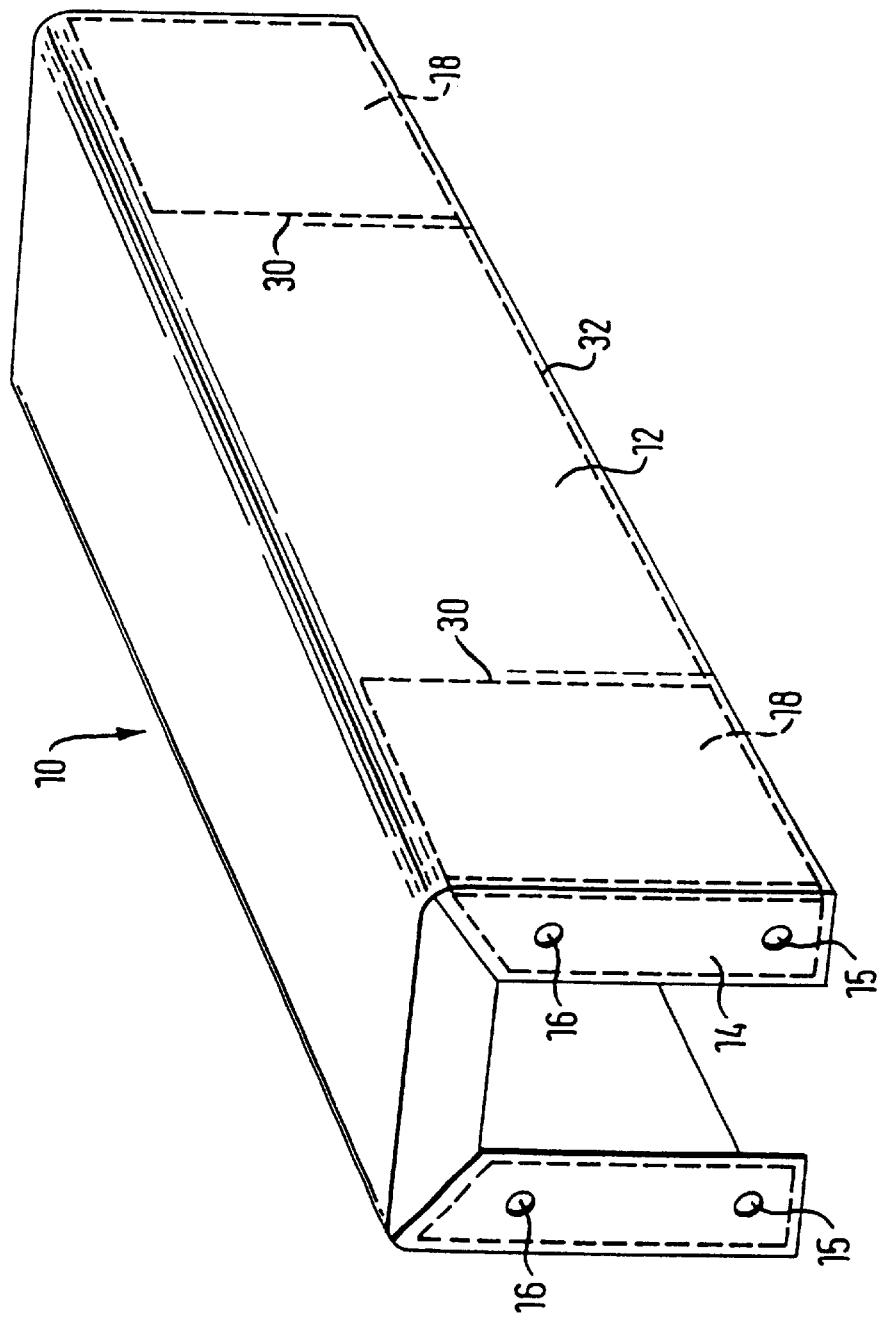
FIG. 2 is a perspective view of the fabric part in a stitched three-dimensional condition.
Figure 3:
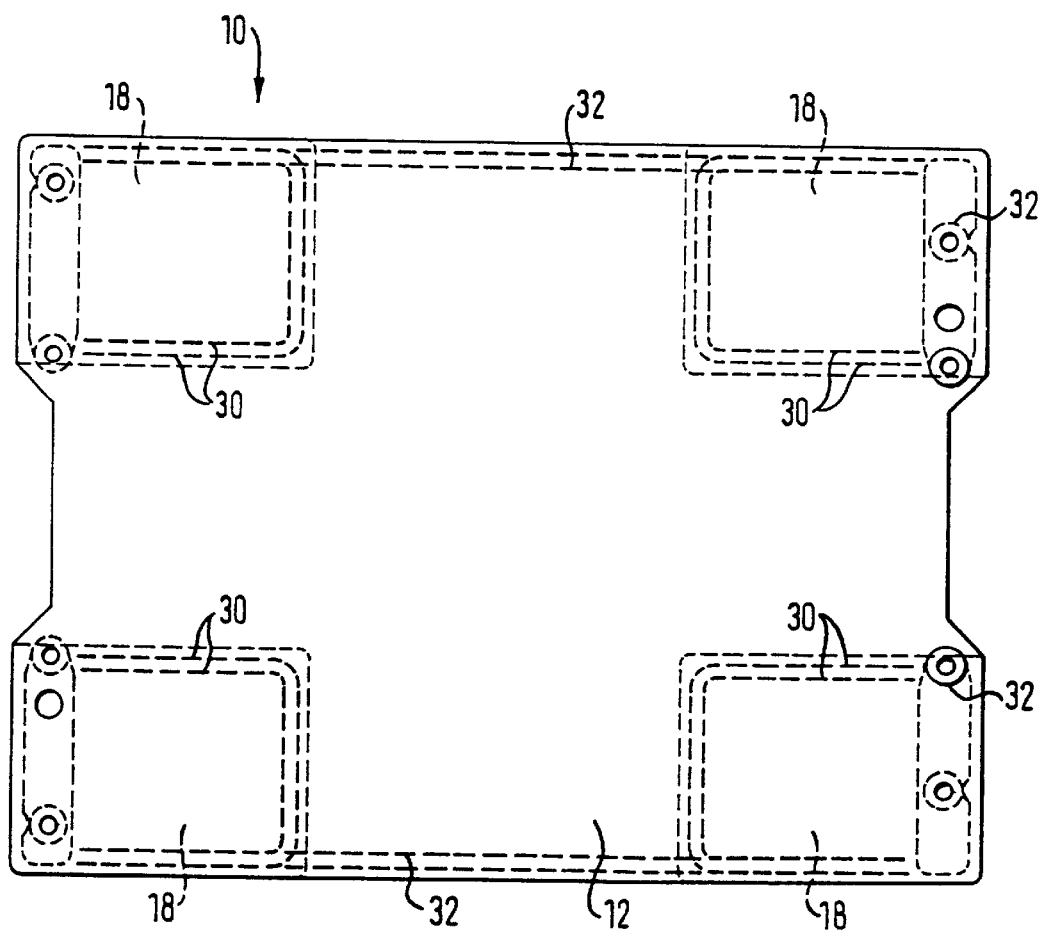
FIG. 3 is an illustration of the fabric part as shown in FIG. 2 spread out flat.

Referring now to FIG. 2 there is illustrated the fabric part 10 as shown in a three-dimensional stitched-together condition which starting from the two-dimensional blank as shown in FIG. 1 is obtained as follows: the reinforcement sections 18 are shifted and turned onto the side of the middle section 12 later intended to form the inner side of the fabric part, such that the opening 21 of the reinforcement part 18 coincides with the opening 16 of the fastening section 14 and the opening 20 of the reinforcement section coincides with the opening 15 of the fastening section. For this purpose the reinforcement sections 18 must be turned roughly through 90° about a point located in the portion of the joining section 22 as well as folded likewise roughly through 90° about an edge located in the portion of the joining section 22. When then the reinforcement sections 18 are stitched to the fastening sections 14 and the middle section 12 the roughly tray-shaped configuration materializes as shown in FIG. 2 (shown turned upside down in this case) in which the middle section 12 forms the two side walls and the bottom of the tray. The fastening sections 14 form part of the face sides of the tray with a passage remaining between the two opposing fastening sections. In FIGS. 2 and 3 the seams by means of which the reinforcement sections 18 are joined to the fastening section 14 and the middle section 12 are identified by the reference numeral 30, whereas seams merely serving to reinforce the outer edge and the openings 15, 16, 20, 21 respectively are identified by the reference numeral 32.

Figure 4:
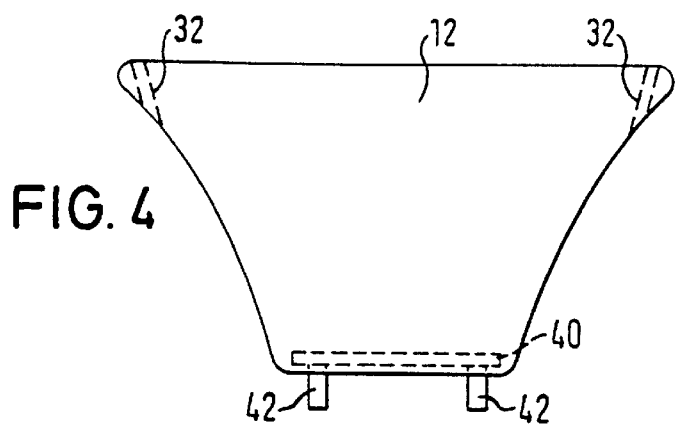
FIG. 4 is a first side view of the fabric part secured to a mounting frame.
Figure 5:
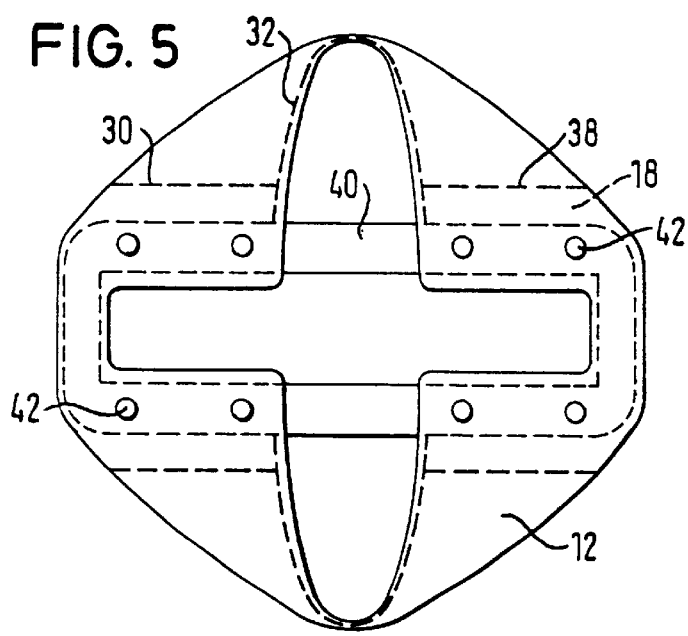
FIG. 5 is a view from underneath of the mounting frame including the fabric part secured thereto.
Figure 6:
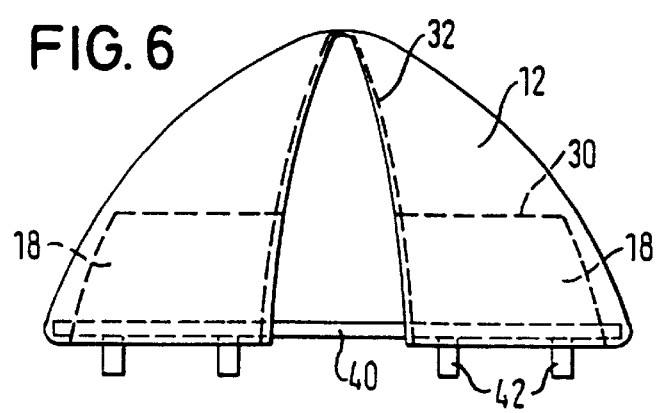
FIG. 6 is a second side view of the fabric part secured to the mounting frame.

Referring now to FIGS. 4 to 6 there is illustrated the fabric part 12 in its finished stitched condition applied to a mounting frame 40. The mounting frame serves to secure a gas bag to the housing of the gas bag module, fastening studs 42 passing through the openings 15, 16, 20, 21 and inset in the mounting frame 40 serving this purpose.

When the fabric part 12 is secured to the mounting frame 40 the fastening sections 14 are located in the one and the same plane. The portion of the middle section 12 which previously represented the bottom of the tray formed by the middle section now extends from a face side of the frame in a curve to the other face side. The longer outer edges of the middle section 12 extend roughly semi-elliptical from the corresponding longitudinal side of the mounting frame.

They fabric part 10 thus forms an antechamber above the mounting frame 40. Compressed gas flowing through the mounting frame 40 into this antechamber emerges from the antechamber through two exit ports each formed between the mounting frame and one of the longer outer edges of the middle section, thus dictating the direction of exit flow of the compressed gas.

What is claimed is:

1. A fabric part intended to be arranged in the interior of a gas bag of a vehicle occupant restraint system, said fabric part when spread out flat comprising a generally rectangular middle section with shorter and longer outer edges as well as four fastening sections, said fastening sections being disposed at said shorter outer edges of said middle section such that each thereof extends starting from said longer outer edges along said shorter outer edges toward a longitudinal centerline of said middle section, each of said fastening sections ending at a distance away from said longitudinal centerline, generally rectangular reinforcement sections being connected by means of transition sections to said shorter outer edges of said middle section in portions of said middle section not taken up by said fastening sections, two openings each, for the passage of fastening studs, being configured in said fastening sections and said reinforcement sections.

2. The fabric part of claim 1, wherein said two openings configured in said fastening section are located on a straight line perpendicular to a straight line on which said two openings of said reinforcement section adjoining a corresponding of said fastening sections are located.

3. A fabric part intended to be arranged in the interior of a gas bag of a vehicle occupant restraint system, said fabric part when spread out flat comprising a generally rectangular middle section with shorter and longer outer edges as well as four fastening sections, said fastening sections being disposed at said shorter outer edges of said middle section such that each thereof extends starting from said longer outer edges along said shorter outer edges toward a longitudinal centerline of said middle section, each of said fastening sections ending at a distance away from said longitudinal centerline, generally rectangular reinforcement sections being connected by means of transition sections to said shorter outer edges of said middle section in portions of said middle section not taken up by said fastening sections, each of said reinforcement sections being stitched to the associated of said fastening sections in such a way that openings in said reinforcement section and in said fastening section are arranged coincident, as a result of which said fabric part assumes a three-dimensional tray-shaped configuration, said middle section forming two side walls and a bottom of the tray-shaped configuration and two of said fastening sections being located opposite each other and each forming face sides of the tray-shaped configuration, a passage remaining between said fastening sections located opposite each other.

4. The fabric part of claim 3, wherein said fabric part is applied by said openings to fastening studs inset in a mounting frame for a gas bag module, said fastening sections being located in a single plane and said fabric part forming an antechamber, the bottom of which is defined by said mounting frame, compressed gas flowing into said antechamber being able to emerge from it through two exit ports each formed between said mounting frame and one of said longer outer edges of said middle section.

5. An apparatus for location inside of an air bag to receive gas for inflating the air bag and to direct the gas into the air bag, said apparatus comprising:

a rectangular shaped mounting frame having an opening through which gas for inflating the air bag flows; and a fabric part fastened to said mounting frame;

said fabric part forming a three-dimensional chamber adjacent said mounting frame, said chamber receiving gas that flows through said mounting frame;

said fabric part having spaced apart fabric portions fastening said fabric part to said mounting frame, said fabric part also having a middle fabric portion defining a pair of semi-elliptically shaped openings for directing gas from said three-dimensional chamber into the air bag, said respective openings being located adjacent opposite sides of said mounting frame.

* * * * *